United States Patent Office 2,900,338
Patented Aug. 18, 1959

2,900,338

GLASS FIBER-THICKENED GREASE COMPOSITIONS

William Postelnek, Dayton, Ohio, assignor to the United States of America as represented by the Secretary of the Air Force No Drawing. Application May 1, 1956
Serial No. 582,054

10 Claims. (Cl. 252—13)

(Granted under Title 35, U.S. Code (1952), sec. 266)

The invention described herein may be manufactured and used by or for the United States Government for governmental purposes without payment to me of any royalty thereon.

This invention relates to improvements in lubricating compositions. More particularly, this invention relates to new and novel grease compositions containing glass fiber material as the thickening ingredient therefor. The grease compositions derived thereby possess improved physical and functional characteristics which are of importance especially in high temperature applications wherein progressively increasing demands on stability, lower evaporation rates and other required properties for practical grease compositions have heretofore been met with only a limited degree of success.

Thickening or bodying agents of many types have previously been employed in the formulation of various types of greases. For many industrial and other applications, metal soaps of fatty acids such as the calcium, sodium and lithium soaps have been extensively used, these materials being suitable for setting up or bodying the base oil lubricant into a grease-like structure. Organic compounds of other types including various polymers, phthalocyanine, substituted ureas, aliphatic and aromatic sulfonates, etc. have also been used for providing greases which possess varying degrees of utility. Inorganic substances have also been employed as thickening agents as illustrated by the use of carbon black, graphite, metallic oxides, clays, asbestos, silica gel, etc. including surface modified materials.

Although suitable greases for some applications may be prepared using the conventional thickening agents, the products are generally unsatisfactory for use under operating conditions involving relatively high temperatures. In the evaluation of a satisfactory grease particularly for high temperature uses, the following defects should not be encountered: (a) melting, hardening or excessive darkening at the desired temperature values; (b) poor mechanical stability before or after heating; (c) high leakage rate; (d) high evaporation rate; and (e) need for a relatively high proportion of thickener in the formulation especially where the substance is rather expensive.

Several types of base oils having favorable high temperature stability characteristics are currently available for use as lubricants and for processing into greases. It has been found, however, that upon addition of any of the conventional thickening ingredients, one or more of the above or other deleterious effects or disadvantages are usually encountered. In some instances, decomposition of the thickener substance itself occurs at the elevated temperatures and in other preparations the decomposition of the base oil is promoted by the presence of specific thickening agents. Then too, the grease is often found to possess poor water resistance or poor rust-inhibiting properties whereby its use under moist or humid conditions becomes highly impractical.

In view of their relatively high thermal stability, siliceous materials have been of particular interest as thickening agents in the preparation of grease compositions such materials consisting of asbestos fibers, silica gel as well as various clays including bentonites, montmorillonites, attapulgite, fuller's earth, and the like. Although it has been sought to take advantage of the relatively high stability of these substances by utilizing them as thickeners for various base oils especially for elevated temperature uses, it has been found in practice that complications are encountered. The use of asbestos fibers for thickening silicone oil into a grease, for example, results in a product which is thermally stable, but the presence of the asbestos markedly accelerates the rate of evaporation of the base oil, thereby impairing the effectiveness of the grease at high temperatures. The use of gels require special processing techniques such as preparing the thickener in a volatile solvent and subsequently replacing solvents in order to avoid loss of gelling properties. In addition to processing difficulties, silica gel greases generally possess poor water resistance and poor rust-inhibiting characteristics. Bentonite thickened greases requiring pre-coating of the colloidal clay with organic amines or other reagents as well as the use of polar dispersing agents to effect satisfactory dispersion of the material in a base oil generally possess relatively poor thermal stability and poor rust-inhibiting properties. Other clays of either the natural or synthetic type involve the same or similar processing difficulties or unfavorable properties which drastically impair their effectiveness as acceptable grease compositions for extensive use, particularly under elevated temperature operational conditions.

It has now been discovered that a silicate substance in the form of glass fibers having a very small diameter may be very effectively and conveniently utilized as thickeners for base oils, the grease compositions resulting therefrom being substantially devoid of the aforesaid limitations and disadvantages. The use of relatively small quantities of such material has been found to be very effective as a thickening agent for various types of base oils imparting to the resulting greases significantly improved stability, alkali and water resistance, and other important properties. The presence of glass fibers of sufficiently small diameter to preclude any abrasive action has been further found to be highly effective in minimizing evaporation of the base oil over prolonged heating periods. This stabilization effect against evaporation is of particular importance at high temperatures where excessive loss of the base oil component may readily result in lubrication failure.

In addition to providing improved functional properties for use especially at higher temperatures, the glass fiber-thickened grease compositions of the present invention possess the further advantages of requiring only relatively small amounts of the thickening agent as well as a highly simplified processing procedure consisting simply of mixing the dry thickener with the oil directly. Although other conventional additives as antioxidants, corrosion inhibitors and anti-wear agents and the like may be incorporated, if desired, into the novel grease formulations of the type herein described, the need for special processing equipment, heating, precoating the thickener, dispersion agents, mutual solvents, etc. is largely eliminated.

It is accordingly an object of this invention to provide grease compositions utilizing relatively small quantities of a silicate thickener in a form suitable for imparting improved stability, resistance to evaporation and other favorable properties and characteristics to the lubricant.

It is another object of this invention to provide grease compositions having improved properties for high temperature use.

A further object is to provide grease compositions containing a thickening agent which is effective in minimizing the evaporation of the base oil component at elevated temperatures whereby compositional changes of the grease may be maintained at a minimum over prolonged periods of use.

A further object is to provide thermally stable grease compositions requiring extremely simplified processing steps in the preparation thereof.

Other objects and advantages will become apparent as this specification proceeds.

Base oils suitable for use in the manufacture of the grease compositions of the present invention may be of varied chemical composition and may include natural and synthetic lubricant oils. Although a high boiling oxidatively stable oil stock is essential for the manufacture of high temperature greases, other base oils yielding greases which are useful at ordinary temperatures may also be thickened with glass fibers to good advantage. Base oils to which glass fibers may be added to form greases in accordance with this invention include lubricants of petroleum origin consisting of paraffinic, naphthenic or aromatic types or mixtures thereof. In lieu of the mineral oils of petroleum origin, vegetable or animal oils may be substituted wholly or in part as well as using synthetic base oils obtained by alkylating, halogenating, polymerizing or otherwise modifying hydrocarbons for use as lubricants in accordance with procedures which are well known by those skilled in the art.

In addition to synthetic base oils of the types indicated above organic esters, diesters, silicone polymers of various molecular weight and viscosity and other synthetic lubricants having favorable high temperature properties may be used to prepare grease compositions thickened by means of glass fibers. Diester oils such as di-2-ethylhexyl sebacate, dioctyl azelate, dioctyl adipate, dihexyl sebacate, dioctyl phthalate, etc. as well as alkylated silanes, e.g. tetradodecyl silane, polyalkyl silicone polymers such as dimethyl silicone polymers and other silicone polymers as methylphenylpolysiloxane, etc. provide illustrative examples of base oils that may be used individually or as components of mixtures suitable for thickening with glass fibers to provide high temperature grease compositions. With the use of the highly stable and chemically durable or inert thickening agent herein proposed, the only limit to the thermal stability of the resulting grease compositions is the inherent properties of the base oil component, excluding any possible effect of other specific additives that may be incorporated in the formulations. When present in grease compositions in the usual small amounts such additives consisting of the well known antioxidants, corrosion inhibitors, anti-wear agents and the like do not appear to cause any discernible adverse effects on the thickening properties of the glass fibers.

The grease-thickening glass fiber material used in preparing the new and novel grease composition comprising the present invention may be of varied chemical composition. The glass composition should possess properties such that processing into fibers of extremely small diameter may be possible in accordance with known procedures of glass fiber manufacture. In general, glass fibers of borosilicate glass compositions may be used for the purpose with the use of glass fibers consisting of substantially soda-free borosilicate glass compositions being preferred in view of enhanced chemical durability, water and corrosion resistance as well as other desirable properties provided thereby. Glass compositions of the types indicated which are familiar to those skilled in the art may consist of numerous formulations which differ not only as to the components included in the mixture but also with respect to the concentrations of the various ingredients. A typical glass composition is illustrated by the following formulation wherein the quantity of each component is given on a per cent by weight basis: $SiO_2$ 54.0, $Al_2O_3$ 14.5, $Fe_2O_3$ 0.4, $CaO$ 15.9, $MgO$ 4.4, $Na_2O$ 0.5, $F_2$ 0.3 and $B_2O_3$ 10. It will be understood that other glass compositions containing the above or other ingredients with varying concentrations of the various components may also be utilized. Substantially different glass compositions suitable for processing into glass fibers are described for example in U.S. Patent No. 2,681,289 to Moore as well as those described in U.S. Patent No. 2,685,526 to Labine illustrating further examples of the various types of glass fiber material that may be employed for grease thickening purposes. A highly satisfactory glass fiber product providing excellent thickening and texturizing results as well as imparting other highly desirable properties and characteristics to the grease compositions derived therewith is available under the designation, "Owens-Corning ¾ micron E glass."

The criteria for suitable thickening agents as applied to glass fiber materials depend in part upon the forces of attraction involved, the relative affinity for the oil used as a base oil, the chemical, abrasive and other related properties including the particle shape thereof. In this connection, it has been found that good results are obtainable with the use of glass fibers of a diameter below three microns and preferably below two microns with optimum results being achieved with material ranging in diameter from about 0.25 to 1 micron. The length of the fibers may be varied as from ⅛ to about 2 inches or more with smaller lengths particles not being particularly detrimental when present in relatively small amounts in the mixture. Thread-like glass fibers of the aforesaid dimensional characteristics virtually preclude any abrasive action on the part of the glass fibers against any metallic surface coming in contact with the grease thickened therewith while providing ample surface area for oil absorption.

Upon dispersion of the glass fiber material having the aforesaid structural characteristics within a given base oil, the attraction between the solid and oleaginous phases is such that the latter is held very firmly on the glass surface. The holding power is sufficient not only to prevent separation of the phases but also to minimize evaporation of the base oil at elevated temperatures. This stabilization of the base oil against evaporation at elevated temperature is an important advantage and is quite unexpected since inorganic thickeners are known to generally enhance evaporation of the base oil.

Evaporation tests carried out in open beakers illustrate the differences attributable to the thickening agent. Accurately weighed quantities of a silicone base oil (DC 550) thickened with (a) 18% by weight of carbon black and (b) 20% asbestos, for example, underwent evaporation losses of over 6 and 22% respectively upon heating for 72 hours at 400° F. Evaporation loss of the same base oil with no thickener under the same conditions was about 2% whereas the sample containing 4% by weight of glass fibers showed no measurable loss of base oil.

The amount of glass fiber to be added to a base oil may be varied in accordance with the degree of thickening desired and other factors including the physical characteristics of thickening agent and the nature of the base oil being used, the presence or absence of additives and the like. In cases where only slight to moderate thickening of the oleaginous substance may be desired for certain applications, the use of amounts up to about 2% by weight based on the weight of the base oil may sufficient. For producing firm greases of medium penetration, however, from about 2 to 15% or more may be required with good results usually being attained by incorporating about 3 to 10%. Optimum amounts for use in preparing high temperature greases utilizing silicone base oils range from about 4 to 6% when fibers of sodium-free borosilicate glass of 0.25 to 1 micron diameter are used.

The processing steps for preparing the grease compositions of this invention are greatly facilitated by the property of the thickening agent of readily blending with any base oil by means of simple mechanical stirring, milling or homogenization at room temperature or thereabouts without the necessity of performing any additional operation such as pre-coating the thickener or requiring any special conditions or equipment. For large scale production these factors are of extreme importance, it being obvious that the process involved may be readily adapted for continuous operation with no difficulties requiring merely the addition of appropriate thickening amounts of the glass fibers in shredded form to the base oil and agitating the mixture to effect uniform dispersion.

The invention is illustrated in the following examples, but is not to be construed as limited to details described therein.

*Example I*

A grease composition was prepared by adding 2 g. of sodium-free borosilicate glass fibers of 0.25 to 1 micron diameter to 48 g. of Arochlor fluid (chlorinated biphenyl) with mechanical stirring at room temperature conditions. The resulting thickened product which was quickly formed possessed a firm consistency and was of medium penetration. Conventional tests indicated favorable stability, alkali- and water-resistance and rust-inhibiting properties.

*Example II*

To 48 g. of silicone oil DC 550 (methylphenylpolysiloxane) was added with stirring 2 g. of thickening agent consisting of borosilicate flass fibers of 0.25 to 1 micron diameter and lengths ranging approximately from ¼ to 2 inches. The firm grease composition of medium penetration which was obtained underwent no appreciable decomposition or degradation by heating to 400° F. for over three days. In addition to the inhibition of base oil evaporation previously discussed, the grease also possessed water- and alkali-resistance and good rust-inhibiting properties.

*Example III*

To 47 g. of silicone oil DC 710 (a higher molecular weight methylphenylpolysiloxane containing more phenyl groups than DC 550 used in the previous example) were added, at room temperature with mechanical stirring, 3 g. of shredded "Owens-Corning ¾ micron E glass." The grease formed thereby was subjected to drastic heating tests including exposure to a temperature of 600° F. for 72 hours. At the end of this period no significant hardening, darkening or decomposition of any kind was apparent and within applicant's knowledge, none of the heretofore known grease compositions possess such outstanding stability characteristics.

*Example IV*

A grease composition comparable to that described in Example II was prepared the only difference being that 3 g. of glass fiber thickener was used. A somewhat firmer grease of medium penetration was obtained possessing the aforesaid desirable stability, water- and alkali-resistance and good rust-inhibiting properties. Use of the material as a lubricant in contact with metal surfaces showed no signs of surface roughening that may be attributable to undesirable abrasive action by the glass fibers in the mixture.

*Example V*

Another grease composition was prepared in accordance with the procedure set forth in the preceding examples excepting that the base oil of the diester type was used. In this instance 3 g. of the glass fiber thickener were added to 47 g. of Plexol 201 consisting primarily of di-2-ethylhexyl sebacate with minor amounts of additives being present in the base oil. The resulting grease was similarly found to possess superior high temperature stability with no adverse wear properties being noted upon testing.

*Example VI*

The addition of 3 g. of glass fibers to 47 g. of a base oil of a different type, namely, tetradodecyl silane similarly provided a stable thickened product which was firm and of medium penetration. Variations in the amount of thickener within the range of from 2 to 15% by weight provide varying degrees of grease consistency with the functional properties thereof not being adversely affected.

*Example VII*

For use at ordinary temperatures, grease compositions containing SAE No. 10 mineral oil thickened with varying amounts of the glass fiber thickening agent were prepared and tested with favorable results. In a typical preparation, 3 g. of the thickener were added to 47 g. of the mineral oil with mechanical agitation at room temperature, the resulting grease being firm and of medium penetration. For providing greases of comparable firmness and penetration characteristics utilizing the same base oil with other types of thickeners, it was found that the amounts of conventional thickeners including the soaps and other types always exceeded the quantity of glass fiber thickener required usually by substantial amounts.

I claim:

1. A lubricating composition consisting essentially of a lubricating oil thickened to a grease consistency by from 2 to 15 percent by weight of glass fibers, said fibers having a diameter less than 3 microns.

2. A grease composition consisting essentially of a thermally stable lubricating oil thickened to a grease consistency by from 2 to 15 percent by weight of glass fiber material, said glass fiber material having a diameter not exceeding about 1 micron.

3. The composition of claim 2 wherein the glass fiber material is a sodium-free borosilicate glass.

4. A grease composition consisting essentially of a silicone lubricating oil having favorable thermal and oxidative stability properties thickened to a grease consistency by from 3 to 10 percent by weight of a glass fiber material, said glass fiber material possessing a diameter of from 0.25 to 1.0 microns.

5. The composition of claim 4 wherein the silicone lubricating oil is methylphenylpolysiloxane.

6. A grease composition consisting essentially of petroleum lubricating oil thickened to a grease consistency by from 2 to 10 percent by weight of glass fibers having a diameter not exceeding 1 micron.

7. The composition of claim 6 wherein the petroleum lubricating oil is SAE No. 10 mineral oil.

8. An alkali and water resistant grease composition for high temperature use consisting essentially of a methylphenylpolysiloxane oil of lubricating viscosity thickened to grease consistency by from about 4 to 6 percent by weight of glass fibers having a diameter of less than 3 microns.

9. A lubricating composition consisting essentially of a lubricating oil thickened to a grease consistency by from 2 to 15% by weight of glass fibers, said glass fibers being from ⅛ to 2 inches in length and having a diameter of from 0.25 to 1.0 microns.

10. A lubricating composition consisting essentially of a lubricating oil thickened to a grease consistency by from 2 to 15% by weight of glass fibers, said glass fibers being from ⅛ to 2 inches in length, said fibers having a diameter less than 3 microns.

References Cited in the file of this patent

UNITED STATES PATENTS

| | | |
|---|---|---|
| 2,107,284 | Bone et al. | Feb. 8, 1938 |
| 2,400,091 | Alfthan | May 14, 1946 |
| 2,427,636 | Vaughan et al. | Sept. 16, 1947 |